United States Patent
Seo et al.

(10) Patent No.: US 9,544,882 B2
(45) Date of Patent: Jan. 10, 2017

(54) METHOD AND APPARATUS FOR TRANSMITTING CHANNEL STATUS INFORMATION IN CARRIER AGGREGATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 363 days.

(21) Appl. No.: 13/989,376

(22) PCT Filed: Nov. 24, 2011

(86) PCT No.: PCT/KR2011/009026
§ 371 (c)(1),
(2), (4) Date: May 23, 2013

(87) PCT Pub. No.: WO2012/070889
PCT Pub. Date: May 31, 2012

(65) Prior Publication Data
US 2013/0258986 A1 Oct. 3, 2013

Related U.S. Application Data

(60) Provisional application No. 61/417,205, filed on Nov. 24, 2010, provisional application No. 61/422,641, filed on Dec. 13, 2010.

(51) Int. Cl.
*H04W 72/04* (2009.01)
*H04L 1/00* (2006.01)
(Continued)

(52) U.S. Cl.
CPC ........ *H04W 72/0413* (2013.01); *H04L 1/0026* (2013.01); *H04L 5/001* (2013.01);
(Continued)

(58) Field of Classification Search
None
See application file for complete search history.

(56) References Cited

U.S. PATENT DOCUMENTS

2005/0265436 A1 12/2005 Suh et al.
2007/0254597 A1 11/2007 Li et al.
(Continued)

FOREIGN PATENT DOCUMENTS

WO 2009-123549 10/2009

OTHER PUBLICATIONS

Alcatel-Lucent Shanghai Bell, et al., "Triggering of Aperiodic CSI with Carrier Aggregation," 3GPP TSG RAN WG1 Meeting #63, R1-105987, Nov. 2010, 6 pages.
(Continued)

*Primary Examiner* — Anh-Vu Ly
*Assistant Examiner* — Roberta A Shand
(74) *Attorney, Agent, or Firm* — Lee, Hong, Degerman, Kang & Waimey

(57) ABSTRACT

Provided are a method and apparatus for transmitting channel status information (CSI) of a user equipment (UE) in a carrier aggregation system. The method includes: receiving an uplink grant including a CSI request field from a base station (BS); and transmitting aperiodic CSI for a first serving cell, a first serving cell set or a second serving cell set according to a bit value of the CSI request field to the BS via the first serving cell.

12 Claims, 12 Drawing Sheets

(51) Int. Cl.
  *H04L 5/00*    (2006.01)
  *H04L 25/02*   (2006.01)
  *H04W 24/10*   (2009.01)
  *H04W 74/04*   (2009.01)

(52) U.S. Cl.
  CPC ............ H04L 5/003 (2013.01); *H04L 5/0007* (2013.01); *H04L 25/0204* (2013.01); *H04W 24/10* (2013.01); *H04W 74/04* (2013.01)

(56) References Cited

U.S. PATENT DOCUMENTS

| | | |
|---|---|---|
| 2009/0190528 A1 | 7/2009 | Chung et al. |
| 2011/0249578 A1* | 10/2011 | Nayeb Nazar et al. ...... 370/252 |
| 2011/0299484 A1* | 12/2011 | Nam et al. .................... 370/329 |
| 2011/0317652 A1* | 12/2011 | Kim et al. ..................... 370/329 |
| 2012/0076017 A1* | 3/2012 | Luo et al. ..................... 370/252 |

OTHER PUBLICATIONS

Alcatel-Lucent Shanghai Bell, et al., "Way Forward on aperiodic CSI triggering," 3GPP TSG RAN WG1 Meeting #63, R1-106540, Nov. 2010, 2 pages.

Korean Intellectual Property Office Application Serial No. 10-2013-7012857, Notice of Allowance dated Aug. 13, 2014, 4 pages.

\* cited by examiner

US 9,544,882 B2

METHOD AND APPARATUS FOR TRANSMITTING CHANNEL STATUS INFORMATION IN CARRIER AGGREGATION SYSTEM

CROSS-REFERENCE TO RELATED APPLICATIONS

This application is the National Stage filing under 35 U.S.C. 371 of International Application No. PCT/KR2011/009026, filed on Nov. 24, 2011, which claims the benefit of U.S. Provisional Application Ser. No. 61/417,205, filed on Nov. 24, 2010 and 61/422,641, filed on Dec. 13, 2010, the contents of which are all hereby incorporated by reference herein in their entirety.

TECHNICAL FIELD

The present invention relates to wireless communications, and more particularly, to a method and apparatus for transmitting channel status information in a wireless communication system supporting carrier aggregation.

BACKGROUND ART

One of the most important requirements of a next generation wireless communication system is to support a required high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which requires separate bands capable of operating respective independent systems is satisfied, and a carrier aggregation (CA) is introduced. In concept, the CA aggregates a plurality of bands into one system. In this case, a band that can be independently managed is defined as a component carrier (CC).

To support growing transmission capacity, the 3GPP LTE-A or the 802.16m has recently expanded its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a carrier aggregation system uses a plurality of CCs, and in this sense, can be called a multi-carrier system.

Meanwhile, channel status information (CSI) needs to be fed back for effective communication between a base station and a user equipment. However, a plurality of downlink CCs can be assigned to the user equipment in the carrier aggregation system. In this case, there is a need for a method in which the base station reports to the user equipment a specific downlink CC for which CSI is requested among the plurality of downlink CCs. In addition, how to feed back the CSI by the user equipment is a matter to be considered.

SUMMARY OF INVENTION

Technical Problem

The present invention provides a method and apparatus for transmitting channel status information of a user equipment in a carrier aggregation system.

Technical Solution

According to an aspect of the present invention, a method of transmitting channel status information (CSI) of a user equipment (UE) in a carrier aggregation system is provided. The method includes: receiving an uplink grant including a CSI request field from a base station (BS); generating CSI for a specific serving cell according to a bit value of the CSI request field; and transmitting the generated CSI to the BS via a first serving cell, wherein if the CSI request field consists of 1 bit and the bit value of the CSI request field is '1', aperiodic CSI for the first serving cell is transmitted, and wherein, in a case where the CSI request field consists of 2 bits and is decoded in a UE-specific search space, the aperiodic CSI for the first serving cell is transmitted if the bit value of the CSI request field is '01', aperiodic CSI for a first serving cell set configured in a higher layer is transmitted if the bit value of the CSI request field is '10', and aperiodic CSI for a second serving cell set configured in the higher layer is transmitted if the bit value of the CSI request field is '11'.

In the aforementioned aspect of the present invention, the generated CSI may be transmitted through a physical uplink shared channel (PUSCH) of the first serving cell.

In addition, if the uplink grant is received in a subframe n, the generated CSI may be transmitted in a subframe n+4.

In addition, the first serving cell set and the second serving cell set may be configured by using a radio resource control (RRC) message.

In addition, the uplink grant further may include a carrier index for indicating the first serving cell.

In addition, the first serving cell may include a downlink component carrier and an uplink component carrier, and the carrier index may indicate the uplink component carrier.

In addition, the aperiodic CSI for the first serving cell may be CSI for the downlink component carrier.

In addition, the method may further include receiving system information indicating a link relation between the downlink component carrier and the uplink component carrier from the BS.

In addition, the uplink grant may be received through any one of a common search space and the UE-specific search space.

According to another aspect of the present invention, there is provided a UE including: a radio frequency (RF) unit for transmitting and receiving a radio signal; and a processor coupled to the RF unit, wherein the processor receives an uplink grant including a CSI request field, generates CSI for a specific serving cell according to a bit value of the CSI request field, and transmits transmitting the generated CSI via a first serving cell, wherein if the CSI request field consists of 1 bit and the bit value of the CSI request field is '1', aperiodic CSI for the first serving cell is transmitted, and wherein, in a case where the CSI request field consists of 2 bits and is decoded in a UE-specific search space, the aperiodic CSI for the first serving cell is transmitted if the bit value of the CSI request field is '01', aperiodic CSI for a first serving cell set configured in a higher layer is transmitted if the bit value of the CSI request field is '10', and aperiodic CSI for a second serving cell configured in the higher layer is transmitted if the bit value of the CSI request field is '11'.

In the aforementioned aspect of the present invention, the generated CSI may be transmitted through a PUSCH of the first serving cell.

In addition, if the uplink grant is received in a subframe n, the generated CSI may be transmitted in a subframe n+4.

In addition, the uplink grant may further include a carrier index for indicating the first serving cell.

In addition, the first serving cell may include a downlink component carrier and an uplink component carrier, the carrier index may indicate the uplink component carrier, and the aperiodic CSI for the first serving cell may be CSI for the downlink component carrier.

In addition, system information may be received to indicate a link relation between the downlink component carrier and the uplink component carrier.

Advantageous Effects

A carrier aggregation system can request a user equipment to feed back channel status information (CSI) while maintaining backward compatibility.

MODE FOR INVENTION

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiplex access (SC-FDMA) in an uplink. LTE-advance (LTE-A) is an evolution of the LTE. For clarity, the following description will focus on the 3GPP LTE/LTE-A. However, technical features of the present invention are not limited thereto.

Figure 1:
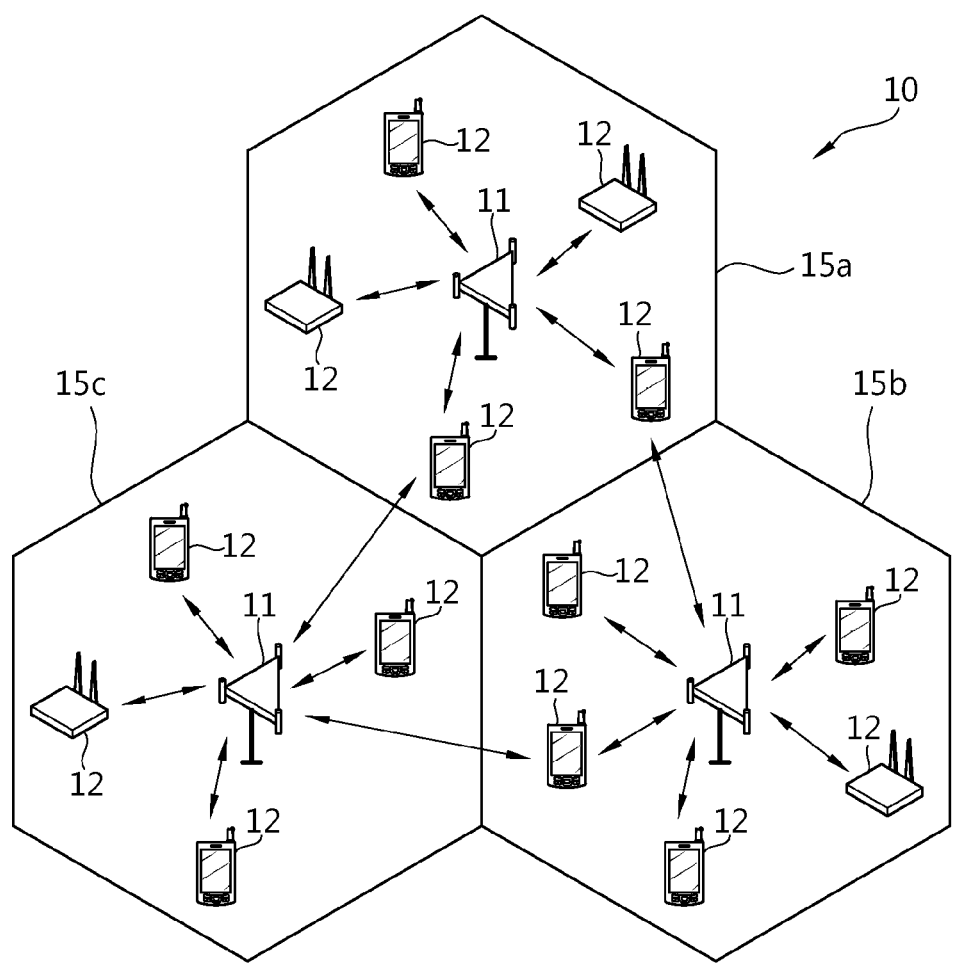
FIG. 1 shows a wireless communication system.

FIG. 1 shows a wireless communication system.

Referring to FIG. 1, a wireless communication system 10 includes at least one base station (BS) 11. Each BS 11 provides a communication service to a specific geographical region. The geographical region can be divided into a plurality of sub-regions 15a, 15b, and 15c, each of which is called a sector. The BS 11 is generally a fixed station that communicates with the UE 12 and may be referred to as another terminology, such as an evolved node-B (eNB), a base transceiver system (BTS), an access point, an access network (AN), etc.

A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc.

Hereinafter, a downlink implies communication from the BS 11 to the UE 12, and an uplink implies communication from the UE 12 to the BS 11.

The wireless communication system 10 may be a system supporting bidirectional communication. The bidirectional communication may be performed by using a time division duplex (TDD) mode, a frequency division duplex (FDD) mode, etc. When in the TDD mode, uplink transmission and downlink transmission use different time resources. When in the FDD mode, uplink transmission and downlink transmission use different frequency resources. The BS 11 and the UE 12 can communicate with each other by using a radio resource called a radio frame.

Figure 2:
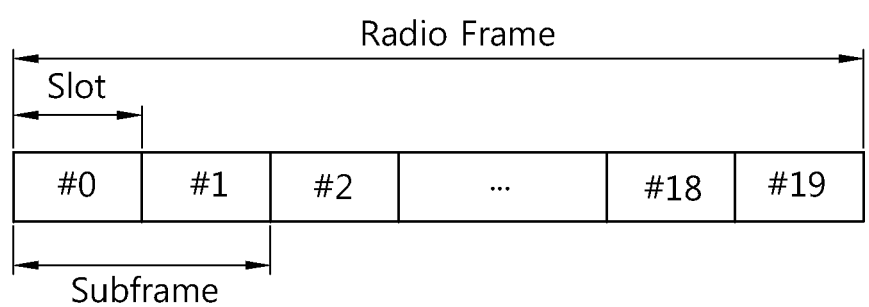
FIG. 2 shows a radio frame structure.

FIG. 2 shows a radio frame structure.

Referring to FIG. 2, a radio frame consists of 10 subframes in a time domain. One subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in the time domain. Since the 3GPP LTE uses OFDMA in a downlink, one symbol period is represented with the OFDM symbol. The OFDM symbol can be referred to as other terms according to a multiple access scheme. For example, the OFDM symbol can also be referred to as an SC-FDMA symbol when SC-FDMA is used as an uplink multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

Figure 3:
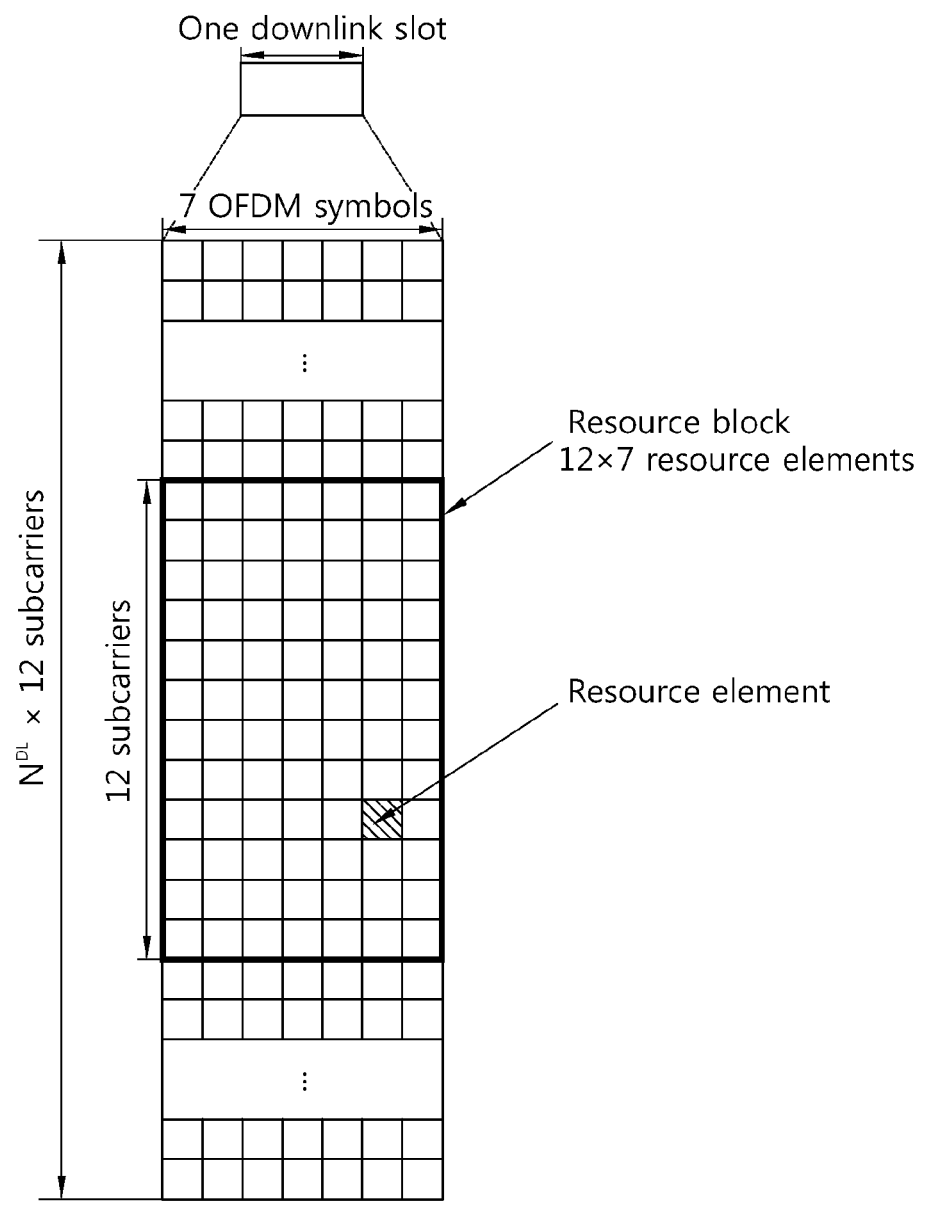
FIG. 3 shows an example of a resource grid for one downlink slot.

FIG. 3 shows an example of a resource grid for one downlink (DL) slot.

Referring to FIG. 3, the DL slot includes a plurality of OFDM symbols in a time domain, and includes $N_{RB}$ resource blocks (RBs) in a frequency domain. The RB includes one slot in the time domain in a unit of resource allocation, and includes a plurality of consecutive subcarriers in the frequency domain. The number $N_{RB}$ of RBs included in the DL slot depends on a DL transmission bandwidth configured in a cell. For example, in the LTE system, $N_{RB}$ may be any one value in the range of 60 to 110. A structure of an uplink (UL) slot may be the same as the aforementioned structure of the DL slot.

Each element on the resource grid is referred to as a resource element (RE). The RE on the resource grid can be identified by an index pair (k,l) within the slot. Herein, k (k=0, . . . , $N_{RB} \times 12-1$) denotes a subcarrier index in the frequency domain, and l (l=0, . . . , 6) denotes an OFDM symbol index in the time domain.

Although it is described in FIG. 3 that one RB consists of 7 OFDM symbols in the time domain and 12 subcarriers in the frequency domain and thus includes 7×12 REs, this is for exemplary purposes only. Therefore, the number of OFDM symbols and subcarriers in the RB are not limited thereto. The number of OFDM symbols and the number of subcarriers may change variously depending on a CP length, a frequency spacing, etc. The number of subcarriers in one OFDM symbol may be any one value selected from 128, 256, 512, 1024, 1536, and 2048.

Figure 4:
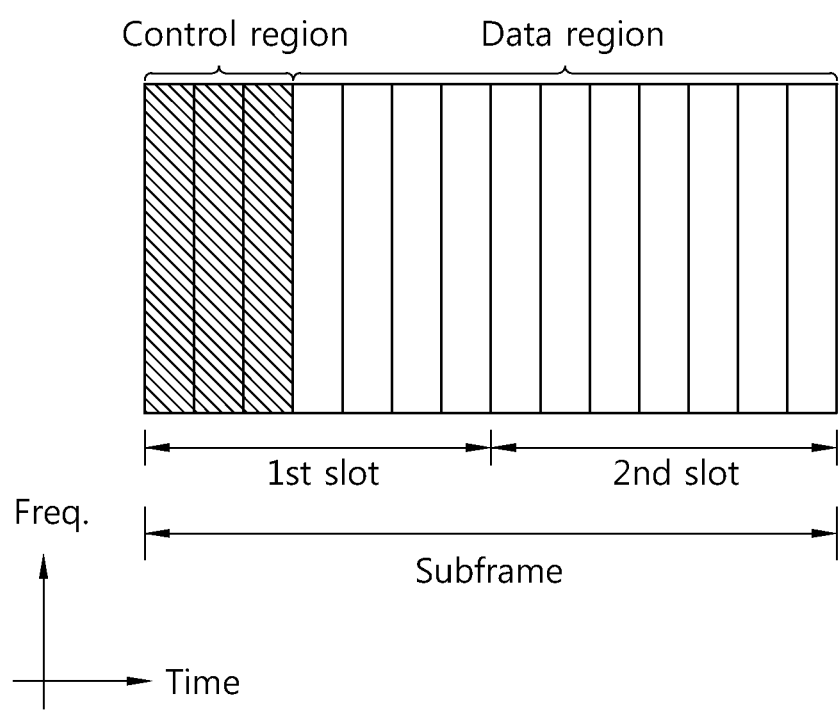
FIG. 4 shows a structure of a downlink subframe in $3^{rd}$ generation partnership project (3GPP) long term evolution (LTE).

FIG. 4 shows a structure of a DL subframe in 3GPP LTE. The subframe includes two consecutive slots. A maximum of three OFDM symbols located in a front portion of a $1^{st}$ slot in the DL subframe correspond to a control region to which a physical downlink control channel (PDCCH) is allocated. The remaining OFDM symbols correspond to a data region to which a physical downlink shared channel (PDSCH) is allocated. Herein, the control region includes 3 OFDM symbols for exemplary purposes only.

In addition to the PDCCH, control channels such as a physical control format indicator channel (PCFICH), a physical hybrid automatic repeat request (HARQ) indicator channel (PHICH), etc., can be allocated to the control region. A UE can read data information transmitted through the data channel by decoding control information transmitted through the PDCCH. The PDCCH will be described below in detail. The number of OFDM symbols included in the control region of the subframe can be known by using the PCFICH. The PHICH carries a hybrid automatic repeat request (HARQ) acknowledgement (ACK)/negative-acknowledgment (NACK) signal in response to the UL transmission. The PDSCH can be allocated to the data region.

[PDCCH Structure]

The control region consists of a logical control channel element (CCE) stream which is a plurality of control channel elements. The CCE corresponds to a plurality of resource element groups (REGs). For example, the CCE may correspond to 9 REGs. The REG is used to define mapping of a control channel to a resource element. For example, one REG may consist of four resource elements. The CCE stream denotes a set of all CCEs constituting the control region in one subframe.

A plurality of PDCCHs may be transmitted in the control region. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be defined as a specific number of CCEs, where the specific number is selected from {1, 2, 4, 8}.

Table 1 below shows examples of the PDCCH format and the number of available PDCCH bits according to the CCE aggregation level.

TABLE 1

| PDCCH format | CCE aggregation level | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as DL control information (hereinafter, DCI). The DCI transmits UL scheduling information (called an uplink grant), DL scheduling information (or called a downlink grant), a UL power control command, control information for paging, control information for indicating a random access channel (RACH) response, etc. The DCI can be transmitted with a specific format, and its usage can be defined according to each DCI format. For example, the usage of the DCI format can be classified as shown in Table 2 below.

TABLE 2

| DCI format | Contents |
| --- | --- |
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |
| DCI format 4 | It is used for PUSCH scheduling in one UL cell in a multi-antenna transmission mode. |

The PDCCH can be generated through the following process. A BS attaches a cyclic redundancy check (CRC) for error detection to DCI to be transmitted to a UE. The CRC is masked with an identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message transmitted through a PCH, a paging indicator identifier (e.g., paging-RNTI (P-RNTI)) may be masked to the CRC. If the PDCCH is for system information transmitted through a DL-SCH, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a corresponding specific UE. When other RNTIs are used, the PDCCH carries common control information received by all UEs in a cell.

Thereafter, channel coding is performed on the CRC-attached control information to generate coded data. Then, rate matching is performed according to a CCE aggregation level assigned to the PDCCH format. Thereafter, the coded data is modulated to generate modulation symbols. The number of modulation symbols constituting one PDCCH may differ depending on a CCE aggregation level (i.e., one value selected from 1, 2, 4, and 8). The modulation symbols are mapped to physical resource elements (REs) (i.e., CCE to RE mapping).

In the 3GPP LTE, the UE uses blind decoding for PDCCH detection. The blind decoding is a scheme in which a desired identifier is de-masked from a CRC of a received PDCCH (referred to as a candidate PDCCH) and an CRC error is checked to determine whether the PDCCH is its own control channel. The blind decoding is performed because the UE cannot know about a specific position in a control region in which its PDCCH is transmitted and about a specific CCE aggregation or DCI format used for PDCCH transmission.

As described above, a plurality of PDCCHs can be transmitted in one subframe. The UE monitors the plurality of PDCCHs in every subframe. Herein, monitoring is an operation in which the UE attempts PDCCH decoding according to a PDCCH format.

The 3GPP LTE uses a search space to reduce an overload caused by blind decoding. The search space can also be called a monitoring set of a CCE for the PDCCH. The UE monitors the PDCCH in the search space.

The search space is classified into a common search space (CSS) and a UE-specific search space (USS). The CSS is a space for searching for a PDCCH having common control information and consists of 16 CCEs indexed with 0 to 15. The CSS supports a PDCCH having a CCE aggregation level of {4, 8}. However, a PDCCH (e.g., DCI formats 0, 1A) for carrying UE-specific information can also be transmitted in the CSS. The USS supports a PDCCH having a CCE aggregation level of {1, 2, 4, 8}.

A start point of the search space is defined differently in the CSS and the USS. Although a start point of the CSS is fixed irrespective of a subframe, a start point of the USS may vary in every subframe according to a UE identifier (e.g., C-RNTI), a CCE aggregation level, and/or a slot number in a radio frame. If the start point of the USS exists in the CSS, the USS and the CSS may overlap with each other.

In a CCE aggregation level $L \in \{1,2,3,4\}$, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k+m) \bmod \lfloor N_{CCE,k}/L \rfloor\}+i \quad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space. In the CSS, $Y_k$ is set to 0 with respect to two aggregation levels L=4 and L=8. In the USS of the CCE aggregation level L, a variable $Y_k$ is defined by Equation 2 below.

$$Y_k=(A \cdot Y_{k-1}) \bmod D \quad \text{[Equation 2]}$$

Herein, $Y_{-1}=n_{RNTI} \neq 0$, A=39827, D=65537, k=floor($n_s/2$), and $n_s$ denotes a slot number in a radio frame.

Table 3 below shows the number of PDCCHs in the search space.

TABLE 3

| PDCCH format | The number of CCEs | The number of candidate PDCCHs in CSS | The number of candidate PDCCHs in USS |
| --- | --- | --- | --- |
| 0 | 1 | — | 6 |
| 1 | 2 | — | 6 |
| 2 | 4 | 4 | 2 |
| 3 | 8 | 2 | 2 |

A DL transmission mode between a BS and a UE can be classified into 9 types as follows.

Transmission mode 1: A mode in which precoding is not performed (a single antenna port transmission mode).

Transmission mode 2: A transmission mode that can be used in 2 or 4 antenna ports using SFBC (transmit diversity).

Transmission mode 3: An open-loop mode in which rank adaptation based on RI feedback is possible (open-loop spatial multiplexing). The transmit diversity is applicable when a rank is 1. A great delay CDD can be used when the rank is greater than 1.

Transmission mode 4: A mode in which precoding feedback supporting dynamic rank adaptation is applied (closed-loop spatial multiplexing).

Transmission mode 5: Multi-user MIMO

Transmission mode 6: Closed-loop rank-1 precoding

Transmission mode 7: A transmission mode in which a UE-specific reference signal is used.

Transmission mode 8: Dual-layer transmission using antenna ports 7 and 8, or single-antenna port transmission using an antenna port 7 or an antenna port 8 (dual-layer transmission).

Transmission mode 9: Up to 8-layer transmission using antenna ports 7 to 14.

Table 4 below shows an example of a DCI format to be monitored by a UE according to the aforementioned DL transmission mode.

TABLE 4

| Transmission mode | DCI format to be monitored |
| --- | --- |
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Close-loop spatial multiplexing | DCI 0/1A, DCI 2 |
| 5. Multi-user MIMO | DCI 0/1A, DCI 1D |
| 6. closed-loop rank = 1 precoding | DCI 0/1A, DCI 1B |
| 7. Single-antenna port; port 5 | DCI 0/1A, DCI 1 |

The UE may have to perform up to 44 blind decoding attempts. The UE receives information regarding a bandwidth of a carrier, a transmission mode, the number of antenna ports, etc., by using system information from the BS, and thus can known in advance a payload size of a PDCCH to be detected when performing blind decoding. The UE performs 44 blind decoding attempts in total, i.e., 32 (i.e., 16×2=32) attempts in the USS and 12 (i.e., 6×2=12) attempts in the CSS, for each of a DL and a UL with respect to the pre-known payload size of the PUCCH.

Figure 5:
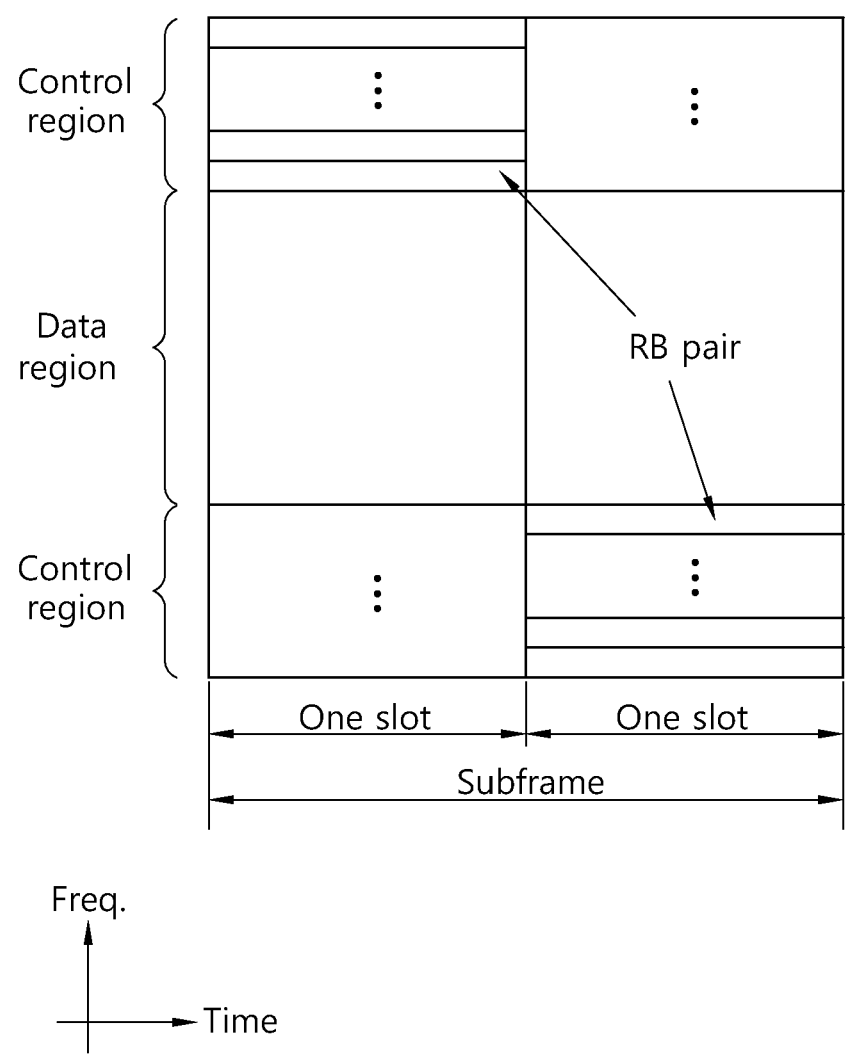
FIG. 5 shows a structure of an uplink subframe.

FIG. 5 shows a structure of a UL subframe.

Referring to FIG. 5, the UL subframe can be divided into a control region and a data region in a frequency domain. A physical uplink control channel (PUCCH) for transmitting UL control information is allocated to the control region. A physical uplink shared channel (PUSCH) for transmitting data (optionally, control information can be transmitted together) is allocated to the data region. According to a configuration, the UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI)) can be transmitted on the PUCCH. Periodic CSI can be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing CSI and a transport block for the UL-SCH. Examples of the CSI multiplexed to the data may include a CQI, a PMI, an RI, etc. Alternatively, the UL data may consist of only CSI. Periodic or aperiodic CSI can be transmitted through the PUSCH. The CSI will be described hereinafter.

[Channel Status Information in Wireless Communication System]

A) Channel Status Information (CSI)

Channel information needs to be fed back for effective communication. In general, downlink channel information is transmitted through an uplink, and uplink channel information is transmitted through a downlink. Channel information indicating a channel status is called CSI. Examples of the CSI include a PMI, an RI, a CQI, etc.

The PMI provides information for a precoding matrix in precoding based on a codebook. The PMI is in association with multiple input multiple output (MIMO). When the PMI is fed back in MIMO, it is called closed-loop MIMO. A downlink transmission mode can be classified into 9 modes as follows. Among them, PMI feedback is used only in modes 4, 5, 6, and 9. Among the downlink transmission modes, a UE feeds back the PMI in a mode 8 when a PMI/RI report is configured.

The RI is information regarding the number of layers recommended by the UE. That is, the RI indicates the number of independent streams used in spatial multiplexing. The RI is fed back only when it operates in a MIMO mode in which the UE uses spatial multiplexing. That is, the RI is fed back only in the DL transmission modes 3, 4, 8, and 9 among the aforementioned DL transmission modes. For example, the RI is not transmitted in a single-antenna port mode or a transmit diversity mode. The RI may be 1 or 2 in a 2×2 antenna configuration, and may be any one of values 1 to 4 in a 4×4 antenna configuration. The RI is also in association with one or more CQI feedbacks. That is, a specific RI value is assumed in calculation of the CQI to be fed back. A rank of a channel changes slowly in general in comparison with the CQI, and thus the RI is fed back less frequently than the CQI. An RI transmission periodicity may be a multiple of a CQI/PMI transmission periodicity. The RI is given for a full system band, and a frequency selective RI feedback is not supported.

The CQI provides information on a link-adaptive parameter that can be supported by the UE in a given time. The CQI may indicate a data rate that can be supported by a downlink channel by considering a UE receiver's property, signal to interference plus noise ratio (SINR), etc. The BS can use the CQI to determine a modulation (e.g., QPSK, 16-QAM, 64-QAM, etc.) and coding rate to be applied to the downlink channel. The CQI can be generated by using various methods. Examples of the methods include a method of feeding back the channel status by directly quantizing it, a method of feeding back the channel status by calculating an SINR, and a method of reporting a status actually applied to a channel, such as a modulation coding scheme (MCS).

When the CQI is generated based on the MCS, the MCS includes a modulation scheme, a coding scheme, and a coding rate depending on the coding scheme. Therefore, since the CQI must be changed when the modulation scheme and the coding scheme are changed, at least one CQI is required per codeword unit.

If MIMO is applied to the wireless communication system, the number of required CQIs is also changed. That is, since a MIMO system generates multiple channels by using multiple antennas, several codewords can be used in general. Accordingly, several CQIs are required. If the plurality of CQIs are used, an amount of control information is increased in proportion thereto.

Figure 6:
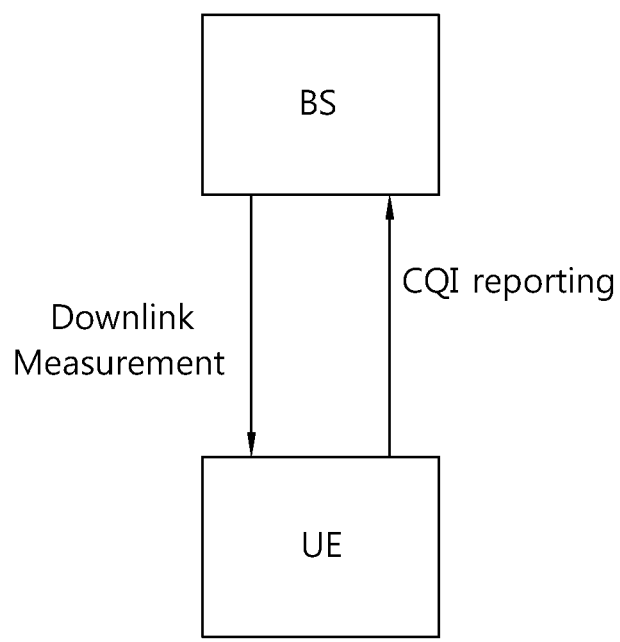
FIG. 6 shows the concept of channel quality indicator (CQI) generation and transmission.

FIG. 6 shows the concept of CQI generation and transmission.

Referring to FIG. 6, a UE measures a downlink channel status, and reports a CQI value selected based on the measured channel status to a BS through an uplink control channel. The BS performs downlink scheduling (i.e., UE selection, resource allocation, etc.) according to the reported CQI. Herein, examples of the CQI value may include an SINR of a channel, a carrier to interference and noise ratio (CINR), a bit error rate (BER), a frame error rate (FER), etc., and may also include a value obtained by converting these values into transmissible data. In case of the MIMO system, rank information (RI), precoding matrix information (PMI), etc., can be added as CSI indicating a channel status in addition to the CQI.

B) Characteristic of CQI in Frequency Band

In order to use given channel capacity to the maximum extent possible in a wireless communication system, link adaptation is used to regulate MCS and transmission power according to a given channel. In order for a BS to perform the link adaptation, it is necessary to feed back CSI of a UE.

If a frequency band used by the wireless communication system has a bandwidth that exceeds a coherence bandwidth, a channel is changed rapidly within that bandwidth. When using OFDM in particular, several subcarriers are present in a given bandwidth and a modulated symbol is transmitted via each of the subcarriers. Therefore, optimal channel transmission is achieved by considering a channel status of each subcarrier. For this, a feedback amount of CSI is rapidly increased in the wireless communication system having a plurality of subcarriers, and thus several methods have been proposed to decrease such an overhead.

C) CQI Generation Method

A method proposed to decrease an overhead caused by an increase in a transmission amount of CSI (e.g., CQI) will be described in brief.

In a first method, a unit of CSI transmission is changed. For example, this is a method for transmitting CSI transmitted in each subcarrier in the OFDM scheme in such a manner that several subcarriers are aggregated into one subcarrier group to transmit the CSI in a unit of the subcarrier group. For example, when 12 subcarriers are aggregated to create one subcarrier group in the OFDM scheme which uses 2048 subcarriers, 171 subcarrier groups are created in total, and thus an amount of CSI actually transmitted is decreased from 2048 to 171.

When a frequency band is divided into an integer number of subcarriers similarly to the OFDM scheme, a CQI subcarrier group or a CQI subband is defined as a basic unit of a method in which one or multiple subcarriers are aggregated into one subcarrier group and then each CQI is reported in the unit of subcarrier group. Meanwhile, when the frequency band is not divided into respective subcarriers, a full frequency band is divided into some frequency bands, and a CQI is generated based on the divided frequency bands. The frequency band divided for the CQI generation is defined as a CQI subband.

In a second method, CSI is compressed when generated. For example, this is a method in which CQI of each subcarrier is transmitted by being compressed using the OFDM scheme. When compressing the CSI, several methods such as discrete cosine transform (DCT) can be considered.

In a third method, CSI is generated by selecting a frequency band. For example, a best-M scheme can be used in which best M bands (where M is a natural number) are selected from subcarriers or subcarrier groups, instead of transmitting channel information for every subcarrier in the OFDM scheme. When the CQI is transmitted by selecting the frequency band, actually transmitted data can be divided into two parts. The first part is a CQI value part, and the second part is a CQI index part.

D) Frequency Band Selective CQI Generation Method

Figure 7:
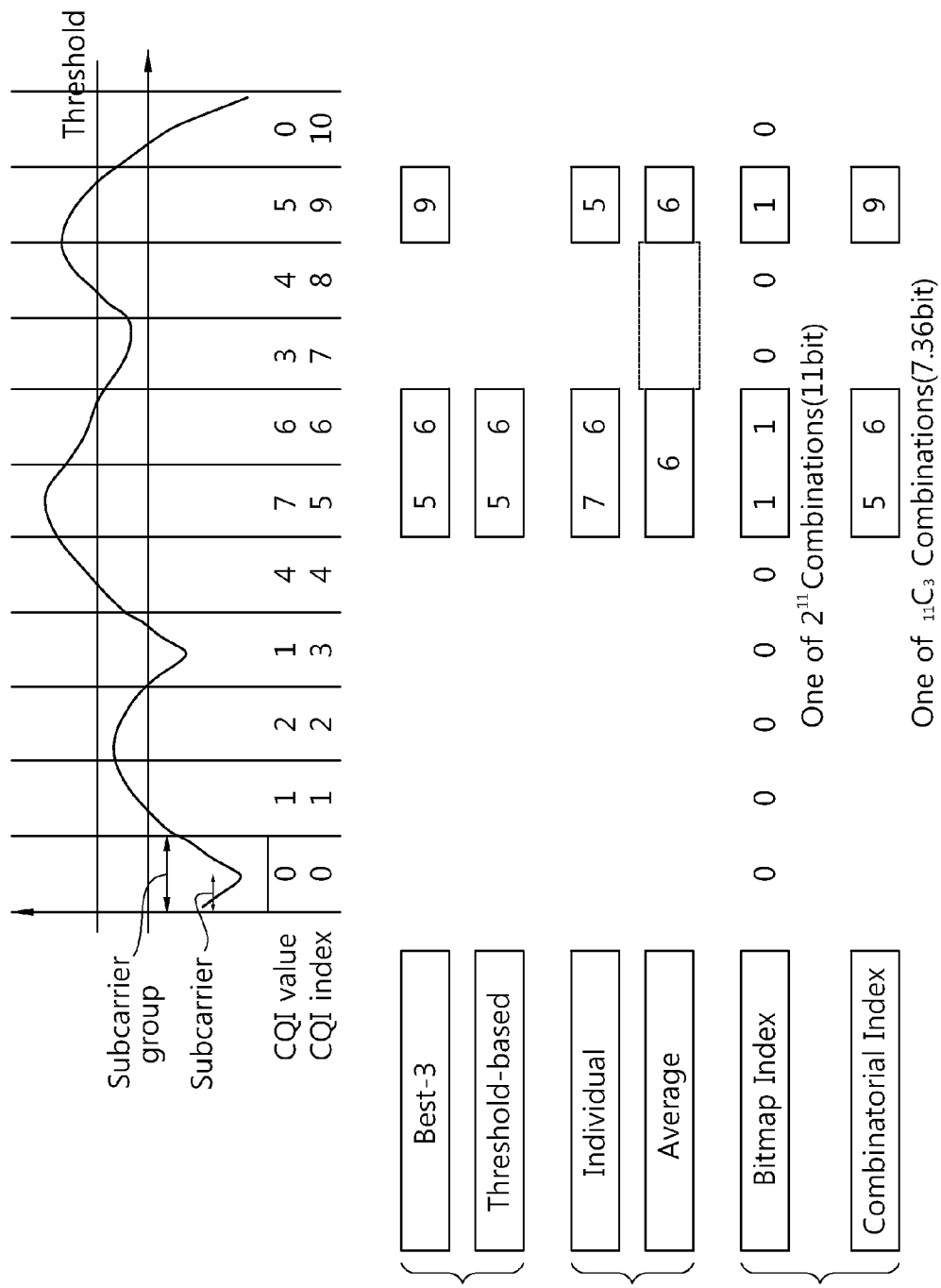
FIG. 7 shows methods for generating a CQI by selecting a CQI subband in a frequency domain.

FIG. 7 shows methods for generating a CQI by selecting a CQI subband in a frequency domain.

Referring to FIG. 7, a frequency band selective CQI generation method roughly consists of three methods. In a first method, a frequency band for generating a CQI, that is, a CQI subband, is selected. In a second method, CQI values of the selected frequency bands are manipulated, generated, and transmitted. In a third method, the selected frequency band, that is, indices of CQI subbands, is transmitted.

Examples of the first method of selecting the CQI subband include a best-M scheme and a threshold-based scheme. The best-M scheme selects M CQI subbands having a good channel status. If M is 3, CQI subbands indexed with 5, 6, and 9 and having a good channel status are selected. The threshold-based scheme selects a CQI subband having a better channel status than a predetermined threshold. In the example of FIG. 7, CQI subbands indexed with 5 and 6 higher than the threshold are selected.

Examples of the second method of generating and transmitting the CQI values include an individual transmission scheme and an average transmission scheme. The individual transmission scheme transmits all CQI values of selected CQI subbands. Therefore, in the individual transmission scheme, the greater the number of the selected CQI subbands, the greater the number of CQI values to be transmitted. The average transmission scheme transmits an average of CQI values of the selected subbands. Therefore, the average transmission scheme has an advantage in that the number of CQI values to be transmitted is one irrespective of the number of the selected CQI subbands. On the other hand, the average transmission has a disadvantage in that accuracy is decreased since an average value of several CQI subbands is transmitted. In the average transmission scheme, the average may be either an arithmetic average or an average considering channel capacity.

Examples of the third method of transmitting the index of the CQI subband include a bitmap index scheme and a combinatorial index scheme. The bitmap index scheme indicates which CQI subband is used in such a manner that, if a specific CQI subband is used, 1 is assigned to a one bit of the specific CQI subband, otherwise if the specific CQI subband is not used, 0 is assigned (of course, the other way around is also possible). In the bitmap index scheme, the number of required bits is equal to the total number of CQI subbands, whereas a corresponding CQI subband can be always expressed with a constant number of bits irrespective of the number of CQI bands in use. In the combinatorial index scheme, the number of CQI subbands to be used is defined, and combinational cases are mapped to respective indices, where the number of combinational cases is equal to the number of CQI subbands in use among the total CQI subbands. For example, if N CQI subbands are present in total and M CQI subband indices are used among the N CQI subbands (where N and M are natural numbers, and N is greater than or equal to M), the total number of possible combinations is as follows.

$$_NC_M = \frac{N!}{(N-M)!M!} \quad \text{[Equation 3]}$$

The number of bits for expressing the number of possible combinations of Equation 3 can be determined by using Equation 4 below.

$$\lceil \log_2(_NC_M) \rceil = \left\lceil \log_2\left(\frac{N!}{(N-M)!M!}\right) \right\rceil \quad \text{[Equation 4]}$$

Since the example of FIG. 7 shows a method for selecting 3 CQI subbands among 11 CQI subbands in total, the number of possible combinations is $_{11}C_3=165$, and the number of bits for expressing 165 is 8 bits.

E) Increase in CQI Transmission Amount in Several Dimensions

The number of CQIs to be transmitted is increased in various dimensions, which may result in a great overhead.

First, the increase in the CQI will be described in a space dimension. In MIMO, several codewords can be transmitted via several layers, and thus several CQIs are required in this case. For example, in 3GPP LTE, up to 2 codewords are available in MIMO, and two CQIs are required in this case. If one CQI consists of 4 bits and two codewords are present, the CQI consists of 8 bits in total. Since the CQI is transmitted by all UEs that must feed back a channel status, a great portion is occupied in whole radio resources. Therefore, it is preferable to decrease the CQI to a minimum amount in terms of channel capacity.

Second, the increase in the CQI will be described in a frequency dimension. The CQI described above is applied only to one frequency band. If a receiving side (i.e., UE) selects a frequency band showing the best channel status and transmits a CQI only for the selected frequency and if a transmitting side (i.e., BS) performs a service via the selected frequency band, then the CQI is required only in one frequency band. Such a case is suitable in a single-user environment, but is not suitable in a multi-user environment. Therefore, a more effective method is required. When only a CQI for one preferred frequency band is transmitted, there is no problem if frequency bands preferred by multiple users do not overlap with each other. However, a problem arises when several users simultaneously select a specific frequency band as preferred frequency bands. In this case, users other than a selected specific user cannot use the frequency band. If each user transmits a CQI only for one preferred frequency band, users who are not selected by the BS have no chance to receive a service at all. Therefore, in order to solve this problem and to effectively obtain a multi-user diversity gain, CQI transmission for several frequency bands is required. When a CQI corresponding to several frequency bands is transmitted, an information amount of CQI transmission is increased. For example, when three frequency bands are selected in the order of a good channel status to transmit each CQI and frequency band indicator, a CQI transmission amount is increased by three-fold, and additional transmission is required for an indicator that indicates the selected frequency band.

Third, the increase in the CQI can occur by considering both space and frequency domains. That is, there may be a case where several CQIs are required in the space dimension, and also several CQIs are required in the frequency domain.

Fourth, the increase in the CQI can occur in other dimensions. For example, when using a code division multiple access (CDMA) scheme, a change in signal strength, interference amount, etc., occurs for each spreading code, and thus there may be a need to consider a CQI for each spreading code. Therefore, the increase in the CQI can occur in a code dimension. In addition thereto, the increase in the CQI can occur in various dimensions.

A differential CQI (or delta CQI) can be used to decrease a CQI transmission amount which is increased as described above.

F) Differential CQI

A case where several CQIs are required has been described above in various dimensions. When the several CQIs are required, a differential CQI can be used to decrease a CQI transmission amount. That is, one reference CQI is selected and the selected reference CQI is normally transmitted whereas only a difference to the reference CQI is transmitted when other CQIs are transmitted. That is, a method similar to differential modulation in a modulation/demodulation scheme is used. Herein, when several CQIs are expressed in a differential manner, the number of bits assigned to a CQI reference value is great in general, and the number of bits assigned to another CQI is relatively small, thereby decreasing the whole CQI transmission amount.

G) CQI Transmission Mode

An uplink channel used for CQI transmission in a 3GPP LTE system is as shown in Table 5 below.

TABLE 5

| Scheduling scheme | Periodic CQI transmission | Aperiodic CQI transmisison |
|---|---|---|
| Frequency non-selective | PUCCH | |
| Frequency selective | PUCCH | PUSCH |

As shown in Table 5 above, the CQI can be transmitted with a period determined in a higher layer through a physical uplink control channel (PUSCH), and can be transmitted aperiodically through a physical uplink shared channel (PUSCH) when required by a scheduler. A case where the CQI is transmitted by using the PUSCH is possible only in the frequency selective case.

1) Transmission of CQI/PMI/RI Through PUSCH after Reception of CQI Transmission Request Signal (i.e., CQI Request)

In this case, a control signal (i.e., CQI request) for requesting CQI transmission is included in a PUSCH scheduling control signal (i.e., UL grant) transmitted through a PDCCH. Table 6 below shows a mode when the CQI/PMI/RI are transmitted through the PUSCH.

TABLE 6

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The mode of Table 6 can be indicated by a higher layer signal transmitted by a BS, and all of the CQI/PMI/RI are transmitted through a PUSCH of the same PUSCH subframe. Mode 1-2, Mode 2-0, Mode 2-2, Mode 3-0, and Mode 3-1 of Table 6 will be described.

1-1) Mode 1-2

A precoding matrix is selected for each subband under the assumption that data is transmitted only via a corresponding subband. A UE generates a CQI by assuming the selected precoding matrix with respect to a system band or a whole band (called a band set S) designated by a higher layer signal.

The UE transmits a PMI value of each subband and the CQI. In this case, a size of each subband may vary depending on a size of the system band.

1-2) Mode 2-0

A UE selects M preferred subbands with respect to a system band or a band (i.e., band set S) designated by a higher layer signal. The UE generates one CQI value under the assumption that data is transmitted in the selected M subbands. The UE additionally generates one CQI (wideband CQI) with respect to the system band or the band set S.

If a plurality of codewords are present with respect to the selected M subbands, a CQI value for each codeword is defined in a differential form. That is, it can be calculated by: Differential CQI=index corresponding to CQI value for selected M subbands−wideband CQI index.

The UE transmits information regarding a location of the selected M subbands, one CQI value for the selected M subbands, and a CQI value generated for the system band or the band set S. In this case, a subband size and a value M may vary depending on a size of the system band.

1-3) Mode 2-2

A UE simultaneously selects a location of M preferred subbands and a single precoding matrix for the M preferred subbands under the assumption that data is transmitted via the M preferred subbands.

A CQI value for the M preferred subbands is defined for every codeword. The UE additionally generates a wideband CQI value with respect to a system band or a band set S.

The UE transmits information regarding a location of M preferred subbands, one CQI value for selected M subbands, and a single precoding matrix index (PMI), wideband PMI, and wideband CQI value for the M preferred subbands. In this case, a subband size and a value M may vary depending on a size of the system band.

1-4) Mode 3-0

A UE generates a wideband CQI value. The UE generates a CQI value for each subband under the assumption that data is transmitted via each subband. In this case, even if RI>1, the CQI value indicates only a CQI value for a first codeword.

1-5) Mode 3-1

A single precoding matrix is generated with respect to a system band or a band set S. A UE generates a subband CQI for each codeword by assuming the previously generated single precoding matrix for each subband. The UE can generate a wideband CQI by assuming a single precoding matrix.

A CQI value for each subband is expressed in a differential form. That is, it can be calculated by: Subband CQI=subband CQI index−wideband CQI index. A subband size may vary depending on a size of the system band.

2) Periodic Transmission of CQI/PMI/RI Through PUCCH

CQI information can be transmitted periodically through a PUCCH or, optionally, through a PUSCH. Even if it is transmitted through the PUSCH, the contents of CQI/PMI/RI are transmitted by being generated according to one of modes defined in Table 7 below.

TABLE 7

| | | PMI Feedback Type | |
| --- | --- | --- | --- |
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In case of Mode 2-0 and Mode 2-1 of Table 7, a bandwidth part (BP) is a set of subbands located contiguously, and can cover both a system band and a band set S. Each subband size, a BP size, and the number of BPs may vary depending on a size of the system band. In addition, the CQI is transmitted for each BP in an ascending order in a frequency domain so that the system band or the band set S can be covered.

The following four transmission types can be present according to transmission combinations of CQI/PMI/RI. Type 1: Subband CQIs (SB-CQIs) of Mode 2-0 and Mode 2-1 are transmitted. Type 2: Wideband CQI (WB-CQI) and PMI are transmitted. Type 3: RI is transmitted. Type 4: WB-CQI is transmitted.

When the RI and the WB-CQI/PMI are transmitted, they are transmitted in subframes each having a different period and offset. When it is configured such that the RI and the WB-CQI/PMI are transmitted in the same subframe, the CQI/PMI are not transmitted.

A period of the WB-CQI/PMI and the SB-CQI is P, and may have the following characteristics. The WB-CQI/PMI may have a period of H*P. In this case, H=J*K+1, J denotes the number of frequency bands, and K denotes the total number of cycles of the frequency band. That is, the WB-CQI/PMI can be transmitted at {0, H, 2H, . . . }. A subband CQI can be transmitted at a time J*K other than a time at which the WB-CQI/PMI are transmitted.

A period of the RI is an M-fold of the WB-CQI/PMI period, and may have the following characteristics. An offset of the RI and the WB-CQI/PMI may be 0. When the RI and the WB-CQI/PMI are transmitted in the same subframe, the WB-CQI/PMI may not be transmitted.

All of the aforementioned parameters P, H, K, and 0 are signaled by being determined by a higher layer.

Each mode of Table 7 will be described.

2-1) Mode 1-0

When transmitting an RI, the RI is generated with respect to a system band or a band set S, and a type 3 report is transmitted. When transmitting a CQI, a WB-CQI is transmitted.

2-2) Mode 1-1

When transmitting an RI, the RI is generated with respect to a system band or a band set S, and a type 3 report is transmitted. When transmitting a CQI/PMI, a single precoding matrix is selected by assuming the most recently transmitted RI. A type 2 report consisting of a WB-CQI, a signal precoding matrix, and a differential WB-CQI is transmitted.

2-3) Mode 2-0

When transmitting an RI, the RI is generated with respect to a system band or a band set S, and a type 3 report is transmitted. When transmitting a WB-CQI, the WB-CQI is generated by assuming the most recently transmitted RI, and a type 4 report is transmitted. When a CQI is transmitted for a selected subband, a UE selects the most preferred subband with respect to J BPs consisting of N subbands, and transmits a type 1 report. The type 1 report may require one or more subframes according to the BP.

2-4) Mode 2-1

When transmitting an RI, the RI is generated with respect to a system band or a band set S, and a type 3 report is transmitted. When transmitting a WB-CQI, the WB-CQI is generated by assuming the most recently transmitted RI, and a type 4 report is transmitted. When a CQI is transmitted for selected subbands, with respect to J BPs consisting of $N_j$ subbands, a UE generates a single CQI value for the selected subbands in the BP by assuming the most recently transmitted PMI/RI, and if RI>1, generates a CQI difference of a codeword by assuming that a single precoding matrix is used in the selected subband and the most recently transmitted RI. Then, a type 1 report is transmitted.

The contents described above with reference to Table 5 to Table 7 may be found in the section 7.2 of 3GPP TS 36.213 V8.7.0(2009-05). Hereinafter, a carrier aggregation system to which the present invention is applicable will be described.

[Carrier Aggregation System]

Figure 8:
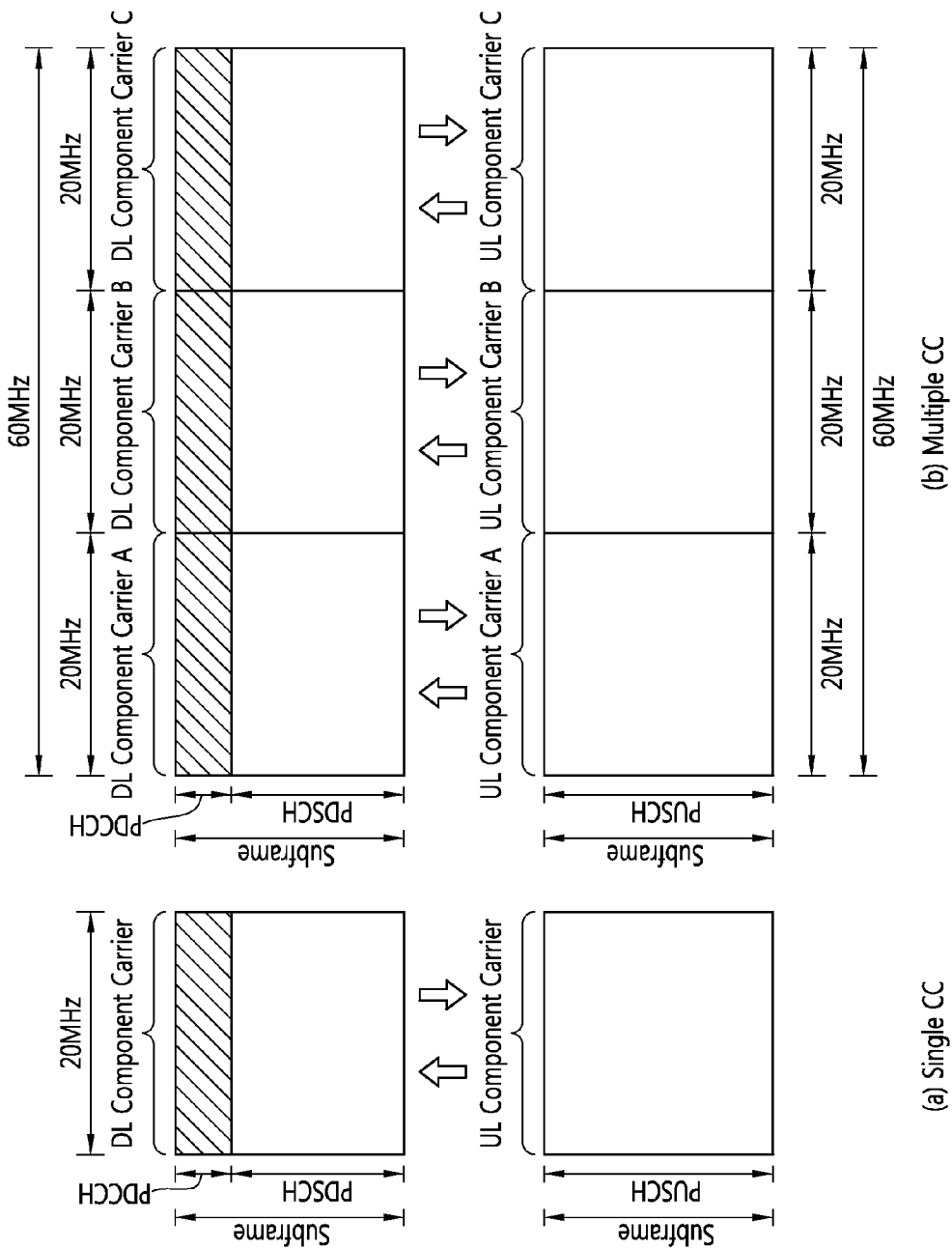
FIG. 8 shows an example of comparing a carrier aggregation system with the conventional single carrier system.

FIG. 8 shows an example of comparing a carrier aggregation system with the conventional single carrier system.

Referring to FIG. 8, only one carrier is supported for a UE in an uplink and a downlink in the single-carrier system. Although the carrier may have various bandwidths, only one carrier is assigned to the UE. Meanwhile, multiple CCs, i.e., DL CCs A to C and UL CCs A to C, can be assigned to the UE in the multiple-carrier system. For example, three 20 MHz CCs can be assigned to the UE to allocate a 60 MHz bandwidth.

The carrier aggregation system can be divided into a contiguous carrier aggregation system in which carriers to be aggregated are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

A system band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply a combination of a downlink frequency resource and an optional uplink frequency resource. In general, if carrier aggregation (CA) is not considered, uplink and downlink frequency resources can always exist in pair in one cell. In order to transmit and receive packet data via a specific cell, the UE first has to complete configuration of the specific cell. Herein, the configuration implies a state where system information required for data transmission and reception for the cell is completely received. For example, the configuration may include an overall procedure that requires common physical layer parameters necessary for data transmission and reception, MAC layer parameters, or parameters necessary for a specific operation in an RRC layer. A cell of which configuration is complete is in a state capable of immediately transmitting and receiving a packet upon receiving only information indicating that packet data can be transmitted.

The cell in a state where its configuration is complete can exist in an activation or deactivation state. Herein, the activation implies that data transmission or reception is performed or is in a ready state. The UE can monitor or receive a control channel (e.g., PDCCH) and a data channel (e.g., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (e.g., PDCCH) and a data channel (e.g., PDSCH) of the deactivated cell.

A cell can be classified into a primary cell, a secondary cell, a serving cell, etc.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure. The secondary cell implies a cell that operates at a secondary frequency. Once an RRC connection is established, the secondary cell is used to provide an additional radio resource.

The serving cell is configured with the primary cell in case of a UE of which CA is not configured or which cannot provide the CA. If the CA is configured, the term 'serving cell' is used to indicate a set consisting of a primary cell and one or a plurality of secondary cells among all secondary cells. That is, the primary cell implies one serving cell that provides a security input and NAS mobility information in an RRC establishment or re-establishment state. According to UE capabilities, it can be configured such that at least one cell constitutes a serving cell set together with the primary cell, and in this case, the at least one cell is called the secondary cell. Therefore, a set of serving cells assigned to only one UE can consist of only one primary cell, or can consist of one primary cell and at least one secondary cell.

A primary component carrier (PCC) denotes a CC corresponding to a primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes connection with the UE, and thus always exists in an activation state when in an RRC connected mode.

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be divided into an activation state and a deactivation state.

A downlink CC corresponding to the primary cell is called a downlink primary component carrier (DL PCC), and an uplink CC corresponding to the primary cell is called an uplink primary component carrier (UL PCC). In addition, in a downlink, a CC corresponding to the secondary cell is called a DL secondary CC (SCC). In an uplink, a CC corresponding to the secondary cell is called a UL SCC.

The primary cell and the secondary cell have the following features.

First, the primary cell is used for PUCCH transmission. Second, the primary cell is always activated, whereas the secondary cell is a cell which is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, the primary cell always consists of a pair of a DL PCC and a UL PCC. Seventh, for each UE, a different CC can be configured as the primary cell. Eighth, a procedure such as reconfiguration, adding, and removal of the primary cell can be performed by an RRC layer. When adding a new secondary cell, RRC signaling can be used for transmission of system information of a dedicated secondary cell.

A DL CC can construct one serving cell. Further, the DL CC can be connected to a UL CC to construct one serving cell. However, the serving cell is not constructed only with one UL CC. Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be configured differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system can support multiple CCs unlike a single carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Figure 9:
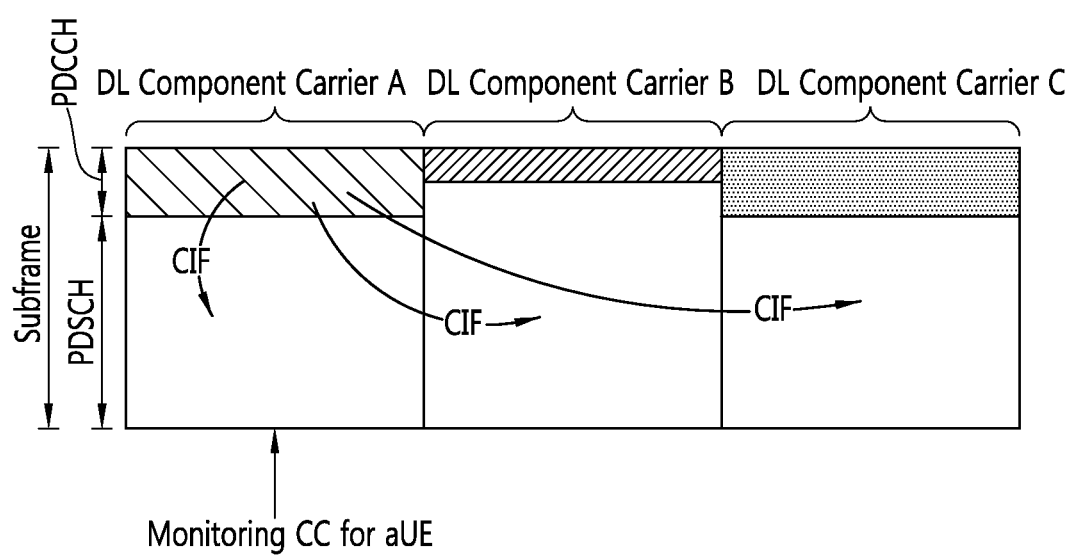
FIG. 9 shows a subframe structure for cross-carrier scheduling in a carrier aggregation system.

FIG. 9 shows a subframe structure for cross-carrier scheduling in a carrier aggregation system.

Referring to FIG. 9, a BS can determine a PDCCH monitoring DL CC set. The PDCCH monitoring DL CC set consists of some DL CCs among all aggregated DL CCs. When the cross-carrier scheduling is configured, a UE performs PDCCH monitoring/decoding only for a DL CC included in the PDCCH monitoring DL CC set. In other words, the BS transmits a PDCCH for a to-be-scheduled PDSCH/PUSCH only via a DL CC included in the PDCCL monitoring DL CC set. The PDCCH monitoring DL CC set can be determined in a UE-specific, UE group-specific, or cell-specific manner.

In the example of FIG. 9, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided.

Hereinafter, a method of feeding back CSI in a carrier aggregation system will be described. In the conventional single carrier system, one serving cell, i.e., one DL CC and one UL CC, is assigned to a UE. Therefore, upon receiving a UL grant including a CSI request field via a DL CC, the UE transmits CSI for the DL CC via a UL CC. On the other hand, in the carrier aggregation system, a plurality of serving cells may be assigned to the UE. That is, a plurality of DL CCs and at least one UL CC can be assigned to the UE. In this case, if the UE receives a UL grant including a CSI request field via a specific DL CC, there is a need to consider for which DL CC the CSI is generated and fed back.

The UE can feed back the CSI by using any one of the following methods 1, 2, and 3. Hereinafter, it is assumed that each serving cell consists of one DL CC and one UL CC, and for clear understanding of the present invention, if necessary, the term 'DL CC' and 'UL CC' will be used instead of the term 'serving cell'.

[Method 1]

In this method, CSI for all DL CCs assigned to a UE or all DL CCs satisfying a specific condition is transmitted. For example, in a case where a DL CC#1, a DL CC#2, and a DL CC#3 are assigned to the UE, if CSI reporting is triggered by using a CSI request field, CSI calculated for all of the DL CC#1 to the DL CC#3 is transmitted independently or average CSI can be transmitted. Alternatively, the UE can transmit CSI only for an activated DL CC.

[Method 2]

If CSI reporting is triggered by using a CSI request field, a UE transmits CSI for a DL CC linked by system information. Herein, the DL CC linked by the system information denotes a DL CC linked by system information with respect to a UL CC indicated by a PDCCH including a UL grant.

For example, UL CCs #1 to #5 can be assigned in a state where DL CCs #1 to #5 are assigned to the UE. In addition, a DL CC#N and a UL CC#N may be linked by the system information. In this case, assume that the PDCCH including the UL grant is transmitted via the DL CC#3, and the UL grant is for the UL CC#4. Then, the UE transmits CSI for the DL CC#4 linked by the system information with respect to the UL CC#4.

[Method 3]

A BS can report a link relation between a DL CC and a UL CC semi-statically by using a higher layer message such as an RRC configuration message or an RRC reconfiguration message. In this method, a UE feeds back CSI for a DL CC determined according to the link relation between the DL CC and the UL CC configured semi-statically.

For example, UL CCs#1 to #5 can be assigned in a state where DL CCs #1 to #5 are assigned to the UE. Further, in a state where the DL CC#1 is linked to the UL CC#1 and the DL CC#2 is linked to the UL CC#2 by the system information, the BS may use a higher layer signal to report that the DL CC#2 is linked to the UL CC#1 semi-statically. In this case, if the BS transmits the PDCCH including the UL grant with respect to the UL CC#1 via the DL CC#1, the UE uses the higher layer message to feed back CSI for the DL CC#2 mapped to the UL CC#1 via the UL CC#2.

The semi-statically configured link relation between the DL CC and the UL CC may be configured independently for each UL CC or may be common to all UL CCs. In a case where the DL CC is commonly linked to all UL CCs, a target DL CC can be indicated by using the following methods when requesting CSI irrespective of to which CC a PUSCH is scheduled.

1. Method Directly Indicating DL CC

A DL CC for which CSI is generated can be directly indicated by using a bitmap. For example, if 5 DL CCs are assigned to a UE, a 5-bit bitmap can be used to indicate a DL CC for which CSI is generated. Each bit of the bitmap is 1:1 mapped to a DL CC, and may be mapped in an order of a carrier index of each DL CC.

The UE may transmit the CSI only for the DL CC indicated by the bitmap, and if the DL CC indicated by the bitmap is a deactivated DL CC, may not transmit the CSI. That is, the UE may transmit the CSI only for an activated DL CC.

2. Method of Indicating DL CC by Using Relative Value With Respect to UL CC

A BS configures a bitmap corresponding to the number of DL CCs that can be assigned to a UE. Each bit of the bitmap may indicate a DL CC with respect to a UL CC. For example, it can be interpreted that a most significant bit (MSB) of the bitmap indicates a DL CC mapped to a UL CC by system information. Therefore, if the MSB is 1, CSI for a DL CC mapped to the UL CC by the system information is fed back. It can be interpreted that bits of the bitmap except for the MSB are mapped to respective DL CCs according to carrier indices of the DL CCs.

Alternatively, the DL CC can be indicated by using a value based on a PDCCH for transmitting a UL grant. That is, a DL CC including the PDCCH for transmitting the UL grant may include a DL CC capable of performing cross-carrier scheduling.

A CSI request field included in the conventional PDCCH consists of one bit. However, it is required to increase the CSI request field to indicate various CSI feedback methods such as the aforementioned methods 1 to 3. For example, the CSI request field can be increased to 2 bits. Then, 4 CSI feedback methods can be indicated in total as shown in the following tables.

TABLE 8

| CSI request field bit | CSI feedback method |
|---|---|
| "00" | No CSI request |
| "01" | Use Method 1 |
| "10" | Use Method 2 |
| "11" | Use Method 3 |

TABLE 9

| CSI request field bit | CSI feedback method |
|---|---|
| "00" | No CSI request |
| "01" | Use Method 2 |
| "10" | Use Method 3 |
| "11" | Use Method 3 |

In Table 9, if the CSI request field bit is "10", a DL-UL link relation configured in a UE specific manner may be used, and if the CSI request field bit is "11", a DL-UL link relation configured in a cell-specific manner may be used.

However, if the number of bits of the CSI request field is increased to 2 bits, a problem may occur since a length of the conventional DCI format is changed. That is, a UE operating in LTE-A can recognize a DCI format of which a length is increased, but a UE operating in the conventional LTE may not be able to properly operate if the length of the DCI format is changed. That is, a DCI format transmitted using a UE-specific search space (USS) allocated for each UE has no problem, but a DCI format transmitted using a common search space (CSS) in which reception is performed commonly by all UEs has a problem in that, if the length of the DCI format is increased, the UE operating in the conventional LTE cannot receive the DCI format. To solve this problem, a method is used in which a DCI format having the same length of the conventional one is used in the CSS and a DCI format in which a length of a CSI request field is increased to 2 bits or a DCI format having the same length as the conventional one is used in the USS.

Hereinafter, a CSI feedback method of a UE will be described when a CSI request field has a different length according to a search space.

Figure 10:
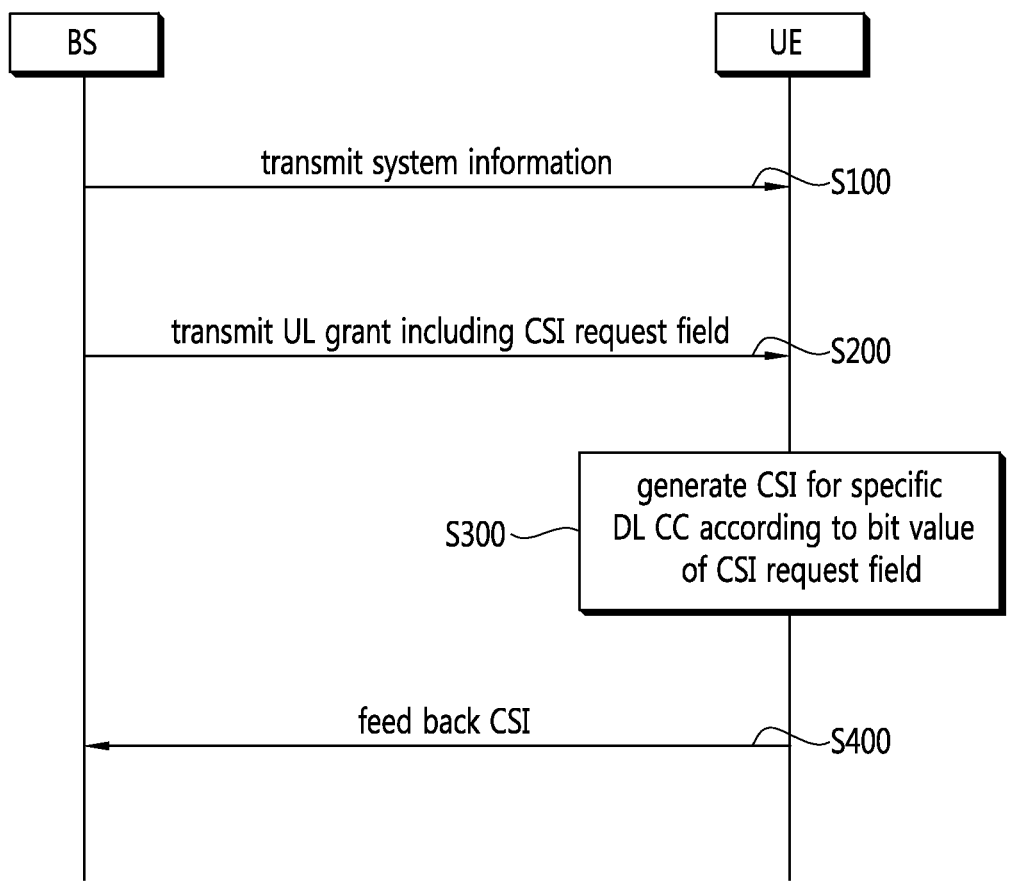
FIG. 10 shows a CSI transmission method according to an embodiment of the present invention.

FIG. 10 shows a CSI transmission method according to an embodiment of the present invention.

Referring to FIG. 10, a BS transmits system information to a UE (step S100). The system information includes information on a serving cell assigned to the UE. The information on the serving cell may include information for reporting a link relation between a UL CC and a DL CC assigned to the UE.

The BS transmits a UL grant including a CSI request field (step S200). Herein, the CSI request field is a field for requesting aperiodic CSI reporting to the UE. The UL grant including the CSI request field may be transmitted through a CSS or a USS.

The UL grant may have a DCI format 0 or a DCI format 4 including a CSI request field. For example, the DCI format 0 is used for PUSCH scheduling, and includes information (field) as follows.

1) a carrier indicator consisting of 0 or 3 bits, 2) a flag for identifying the DCI format 0 and a DCI format 1A (if the flag is 0, it indicates the DCI format 0, and if the flag is 1, it indicates the DCI format 1A), 3) a hopping flag (1 bit), 4) a resource block designation and a hopping resource allocation, 5) a modulation and coding scheme and a redundancy version (5 bits), 6) a new data indicator (1 bit), 7) a TPC command (2 bits) for a scheduled PUSCH, 8) a cyclic shift (3 bits) for DM-RS, 9) a UL index, 10) a DL designation index (only in a TDD), 11) CQI request, etc. Herein, the CSI request field may consist of 1 bit or 2 bits. The 2-bit CQI request field is applied only to a UE for which two or more DL cells are configured and a corresponding DCI format is given by a cell-radio network temporary identifier (C-RNTI) in the USS.

The UE generates CSI for a specific DL CC according to a bit value of the CSI request field (step S300). This will be described below in greater detail with reference to FIG. 11.

The UE feeds back the CSI to the BS (step S400). The UE may feed back aperiodic CSI to the BS through a PUSCH of a UL CC indicated by a UL grant.

Now, a process of generating CSI for a specific DL CC (i.e., a specific serving cell) by a UE according to a value of a CSI request field will be described.

Figure 11:
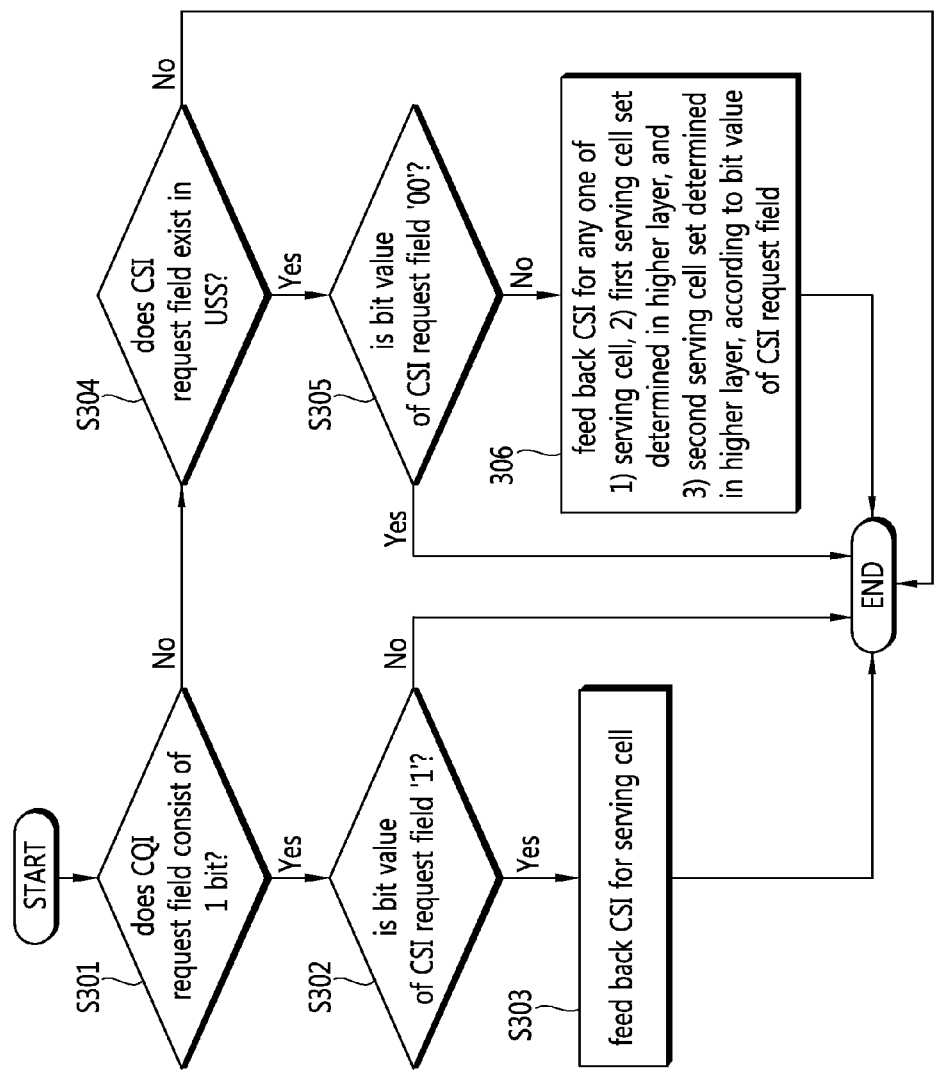
FIG. 11 shows a CSI transmission method according to an embodiment of the present invention.

FIG. 11 shows a CSI transmission method according to an embodiment of the present invention.

Referring to FIG. 11, a UE determines whether a CSI request field consists of 1 bit (step S301). If the CSI request field consists of 1 bit, whether a bit value of the CSI request field is '1' is determined (step S302), and if it is '1', CSI for a serving cell is fed back (step S303). Herein, the serving cell implies a DL CC mapped by system information to a UL CC indicated by a UL grant including the CSI request field. If the bit value of the CSI request field is '0', the CSI is not fed back. That is, as shown in Table 10 below, if the bit value of the CSI request field is '1', the CSI can be fed back according to the aforementioned method 2.

TABLE 10

| CSI request field bit | CSI feedback method |
|---|---|
| "0" | no CSI request |
| "1" | use Method 2 |

If the CSI request field does not consist of 1 bit, that is, if the CSI request field consists of 2 bits, it is determined whether the CSI request field exists in a UE-specific search space (USS) (step S304). If the CSI request field exists in the USS, it is determined whether the bit value of the CSI request field is '00' (step S305), and if it is '00', the CSI is not fed back. If the bit value of the CSI request field is not '00', the CSI is fed back for any one of: 1) a serving cell; 2) a first serving cell set determined in a higher layer; and 3) a second serving cell set determined in the higher layer, according to the bit value (step S306). That is, the CSI is fed back according to Table 11 below.

TABLE 11

| CSI request field bit | CSI feedback |
|---|---|
| '00' | no aperiodic CSI request |
| '01' | aperiodic CSI report for serving cell |
| '10' | aperiodic CSI report for first serving cell set determined in higher layer |
| '11' | aperiodic CSI report for second serving cell set determined in higher layer |

That is, in the above method, if a UE to which a plurality of serving cells are assigned receives a DCI format 0 through a USS and if a 2-bit CSI request field is included in the DCI format 2, then Table 11 is applied. In addition, if the DCI format 0 is received through a CSS and if a 1-bit CSI request field is included in the DCI format 0, then Table 10 is applied.

Hereinafter, another example of a CSI feedback method of a UE according to a 1-bit CSI request field transmitted in a CSS is described. Tables 12 and 13 below show an operation method when the UE detects the 1-bit CSI request field in the CSS.

TABLE 12

| CSI request field bit | CSI feedback method |
|---|---|
| "0" | no CSI request |
| "1" | use Method 1 |

TABLE 13

| CSI request field bit | CSI feedback method |
|---|---|
| "0" | no CSI request |
| "1" | use Method 3 |

Alternatively, if a CSI request field bit is '1' in the CSS, a specific method to be used among CSI feedback methods indicated by the USS of Table 11 may be reported by using an RRC message. That is, if the CSI request field bit is '1' in the CSS, a CSI feedback method is determined according to 2-bit information of the RRC message. If the CSI request field is '1', only 1 bit of the RRC message may be transmitted by using only some of CSI feedback methods indicated by the USS as shown in Table 11.

Meanwhile, in case of semi persistent scheduling (SPS) transmission, a small amount of resources are allocated to a PUSCH for UL SPS transmission since it is used primarily for the purpose of periodically transmitting a VoIP or a small amount of data. Since resources are not sufficient, it is preferable to send CSI only for one DL CC at an aperiodic CSI request. That is, preferably, the method 2 is used or only one DL CC is configured using RCC in the method 3.

If the UL SPS is performed in the CSS, that is, if scheduling is performed by CRC-masking a PDCCH with an SPS C-RNTI, it is preferable to use the method 2 since a CSI request can use only one status. The UE may operate by interpreting the 1-bit CSI request field as follows.

Combination 1.
If PDCCH is scheduled by being CRC-scrambled with C-RNTI.

TABLE 14

| CSI request field bit | CSI feedback method |
|---|---|
| "0" | no CSI request |
| "1" | use Method 3 |

If PDCCH is scheduled by being CRC-scrambled with SPS C-RNTI.

TABLE 15

| CSI request field bit | CSI feedback method |
|---|---|
| "0" | no CSI request |
| "1" | use Method 2 |

Combination 2.
If PDCCH is scheduled by being CRC-scrambled with C-RNTI.

TABLE 16

| CSI request field bit | CSI feedback method |
|---|---|
| "0" | no CSI request |
| "1" | use Method 2 |

If PDCCH is scheduled by being CRC-scrambled with SPS C-RNTI.

TABLE 17

| CSI request field bit | CSI feedback method |
|---|---|
| "0" | no CSI request |
| "1" | use Method 2 |

Combination 3.
If PDCCH is scheduled by being CRC-scrambled with C-RNTI.

TABLE 18

| CSI request field bit | CSI feedback method |
|---|---|
| "0" | no CSI request |
| "1" | use Method 1 |

If PDCCH is scheduled by being CRC-scrambled with SPS C-RNTI.

TABLE 19

| CSI request field bit | CSI feedback method |
|---|---|
| "0" | no CSI request |
| "1" | use Method 2 |

Figure 12:
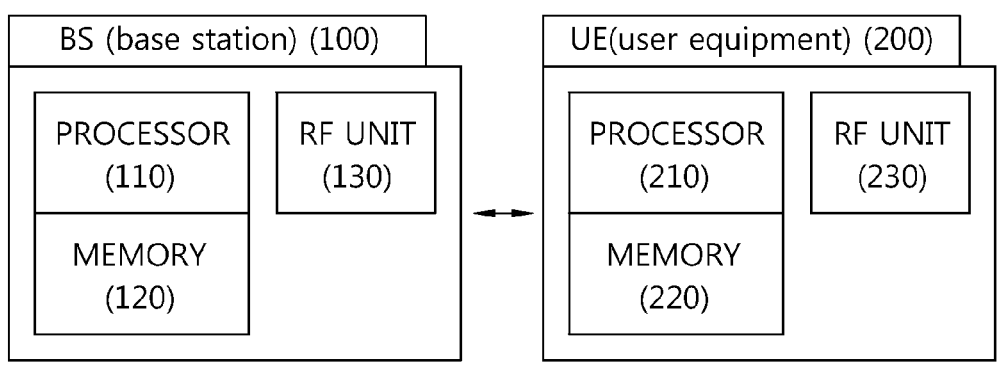
FIG. 12 shows a structure of a user equipment and a base station according to an embodiment of the present invention.

FIG. 12 shows a structure of a UE and a BS according to an embodiment of the present invention.

A BS 100 includes a processor 110, a memory 120, and a radio frequency (RF) unit 130. The processor 110 implements the proposed functions, procedures, and/or methods. For example, the processor 110 transmits system information on a serving cell to a UE, and transmits a UL grant including a CSI request field. The CSI request field may consist of 1 bit or 2 bits. The UL grant may be transmitted through a common search space or a UE-specific search space. Further, the processor 110 receives CSI fed back from the UE. The memory 120 is coupled to the processor 110 to store a variety of information for driving the processor 110. The RF unit 130 is coupled to the processor 110 to transmit and/or receive a radio signal.

A UE 200 includes a processor 210, a memory 220, and an RF unit 230. The processor 210 implements the proposed functions, procedures, and/or methods. For example, the processor 210 receives a UL grant including a CSI request field from the BS, and generates CSI for a specific serving cell according to a bit value of the CSI request field. Further, the processor 210 transmits the generated CSI to the BS via a first serving cell. In this case, if the CSI request field consists of 1 bit and the bit value of the CSI request field is '1', aperiodic CSI for the first serving cell is transmitted. In addition, in a case where the CSI request field consists of 2 bits and is decoded in a UE-specific search space, the aperiodic CSI for the first serving cell is transmitted according to the bit value of the CSI request field, or aperiodic CSI for a first serving cell set or second serving cell configured in a higher layer is transmitted to the BS. The memory 220 is coupled to the processor 210 to store a variety of information for driving the processor 210. The RF unit 230 is coupled to the processor 210 to transmit and/or receive a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting channel status information (CSI) of a user equipment (UE) in a carrier aggregation system, the method comprising:
receiving a higher layer signal comprising a bitmap from a base station (BS);
receiving a downlink control information (DCI) format including a CSI request field from the BS,
wherein a size of the CSI request field is 1 bit and a size of the bitmap is N bits, N being a natural number larger than 1;
generating CSI for a specific downlink component carrier (DL CC), based on the bitmap, among N DL CCs which are configured for the UE when the CSI request field triggers a CSI reporting; and
transmitting the generated CSI to the BS,
wherein each bit of the bitmap is mapped to a corresponding one of the N DL CCs and indicates a DL CC for which CSI is generated.

2. The method of claim 1, wherein the generated CSI is transmitted through a physical uplink shared channel (PUSCH).

3. The method of claim 1, wherein the N is a natural number less than or equal to 5.

4. The method of claim 1, wherein a size of the CSI request field is 1 bit or 2 bits.

5. The method of claim 1, wherein DCI format further includes a carrier index field indicating an uplink component carrier (UL CC).

6. The method of claim 5, wherein the generated CSI is transmitted through the UL CC indicated by the carrier index field.

7. A user equipment (UE) comprising:
a radio frequency (RF) unit configured transmit and receive a radio signal; and
a processor coupled to the RF unit and configured to:
receive a higher layer signal comprising a bitmap from a base station (BS),
receive a downlink control information (DCI) format including a channel status information (CSI) request field from the BS,
wherein a size of the CSI request field being 1 bit and a size of the bitmap is N bits, N being a natural number larger than 1,
generate CSI for a specific downlink component carrier (DL CC), based on the bitmap, among N DL CCs which are configured for the UE when the CSI request field triggers a CSI reporting, and
transmit the generated CSI,
wherein each bit of the bitmap is mapped to a corresponding one of the N DL CCs and indicates a DL CC for which CSI is generated.

8. The UE of claim 7, wherein the generated CSI is transmitted through a physical uplink shared channel (PUSCH).

9. The UE of claim 7, wherein the N is a natural number less than or equal to 5.

10. The UE of claim 7, wherein DCI format further includes a carrier index field indicating an uplink component carrier (UL CC).

11. The UE of claim 10, wherein the generated CSI is transmitted through the UL CC indicated by the carrier index field.

12. The UE of claim 7, wherein a size of the CSI request field is 1 bit or 2 bits.

* * * * *